(No Model.)  9 Sheets—Sheet 1.

P. YOE.
CASH REGISTER AND INDICATOR.

No. 551,663. Patented Dec. 17, 1895.

WITNESSES:
A. H. Graham
John Catlin

INVENTOR
Philip Yoe,
BY
Geo. H. Graham
ATTORNEY (No Model.) 9 Sheets—Sheet 3.
P. YOE.
CASH REGISTER AND INDICATOR.
No. 551,663. Patented Dec. 17, 1895.

WITNESSES: INVENTOR
Philip Yoe
BY
ATTORNEY (No Model.)  9 Sheets—Sheet 4.

P. YOE.
CASH REGISTER AND INDICATOR.

No. 551,663. Patented Dec. 17, 1895.

WITNESSES:  INVENTOR
  Philip Yoe
  BY
  ATTORNEY (No Model.)

P. YOE.
CASH REGISTER AND INDICATOR.

No. 551,663.  Patented Dec. 17, 1895.

WITNESSES:
W. H. Graham
John Collin

INVENTOR
Philip Yoe,
BY
G. H. Graham
ATTORNEY

(No Model.) 9 Sheets—Sheet 9.

P. YOE.
CASH REGISTER AND INDICATOR.

No. 551,663. Patented Dec. 17, 1895.

WITNESSES:
W. H. Graham
John Cutler

INVENTOR
Philip Yoe
BY
Geo. L. Graham
ATTORNEY

UNITED STATES PATENT OFFICE.

PHILIP YOE, OF DAYTON, OHIO, ASSIGNOR, BY MESNE ASSIGNMENTS, TO THE NATIONAL CASH REGISTER COMPANY, OF SAME PLACE.

CASH REGISTER AND INDICATOR.

SPECIFICATION forming part of Letters Patent No. 551,663, dated December 17, 1895.

Application filed March 9, 1893. Serial No. 465,298. (No model.)

*To all whom it may concern:*

Be it known that I, PHILIP YOE, of the city of Dayton, county of Montgomery, and State of Ohio, have invented certain new and useful Improvements in Cash-Registers, fully set forth in the following description and represented in the accompanying drawings.

My invention relates generally to cash registering and indicating machines, and more particularly to that class of mechanism in which the amounts of purchases are indicated and registered by the salesman and at the same time effect the opening of a cash-drawer to make change, these operations being accompanied by certain visible and audible signals to the purchaser on the part of the machine.

The present improvements consist, briefly, in a rotating or a plurality of rotating keys combined with a target or other indicator, or a plurality of the same, that is or are moved into exposed position by the rotation of a key or keys, a key-lock by which as any key is rotated the other keys are locked against movement, two sets of such keys with targets and a key-lock for each set by which a key in each set may be operated, a cash drawer or receptacle exposed by the operation of a key, and an automatic screen or shutter moved to cover the target-exposing space upon the opening of the cash-drawer and moved to uncover said space to expose the target when the drawer is closed.

The improvements furthermore consist in a locking mechanism capable of a number of positions whereby certain parts of the mechanism are prevented from operation or all of the parts of the mechanism are locked against action, as may be desired, the novel structure of the five-cents register and the register for the odd and even multiples of five and the carrying and actuating devices, the novel means of carrying from the primary to the secondary register-wheel, embracing a cam and weighted pawl, and many other details and arrangements of parts fully hereinafter set forth.

In the accompanying nine sheets of drawings, Figs. 8 and 9 represent the apparatus in the act of tripping the lock midway of its forward stroke. Fig. 12$^a$, a detail perspective view of one of the rotary keys; and Fig. 12$^b$, a detail front elevation of the locking-bar which supports the indicators in exposed position, showing one of the indicators so supported by said bar.

Throughout the specification the same reference-figure refers to the same part.

Figure 1:
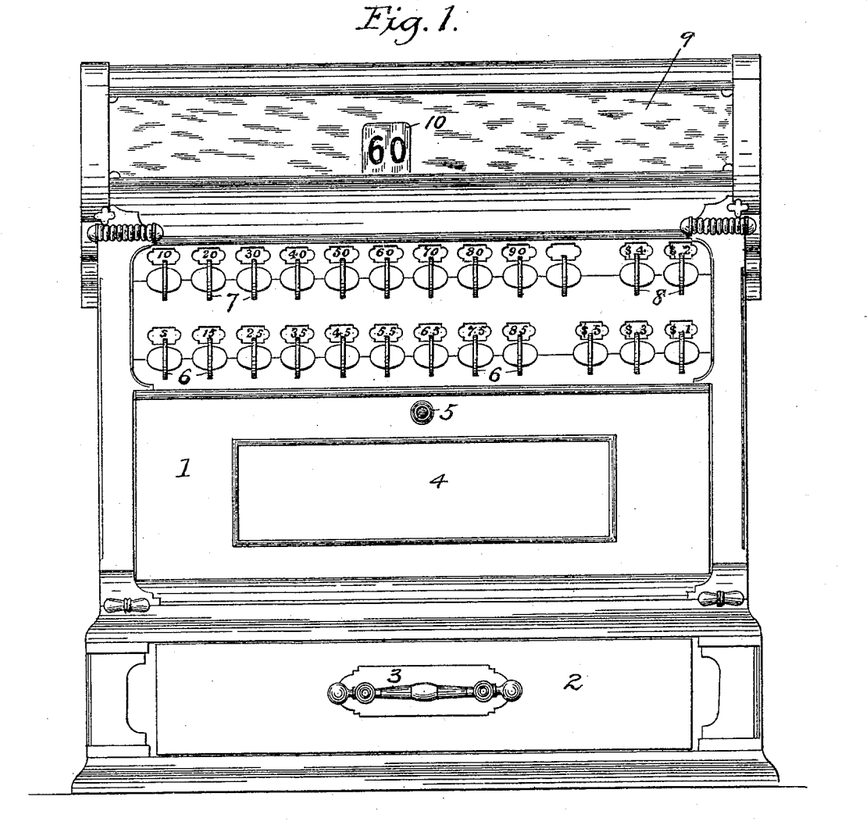
Figure 1 is a front elevation of the machine in its case.
Figure 2:
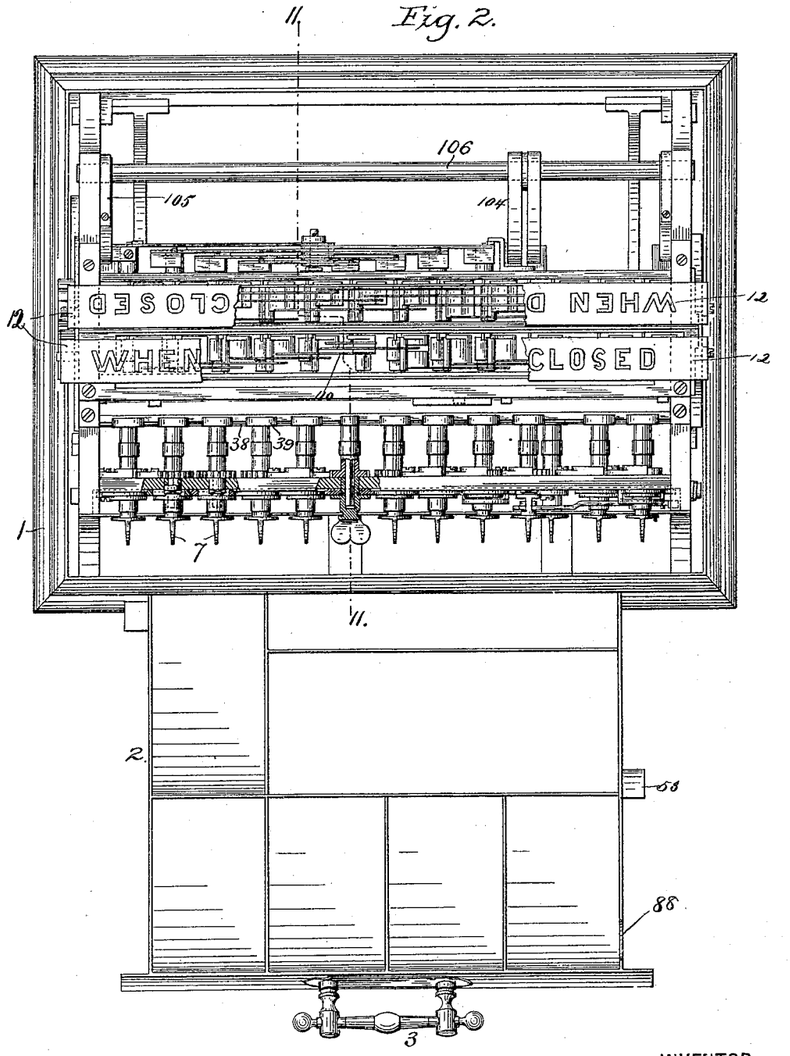
Fig. 2 is a plan view with the money-drawer open, the upper part of the case removed and portions of the mechanism broken away or shown in section.
Figure 3:
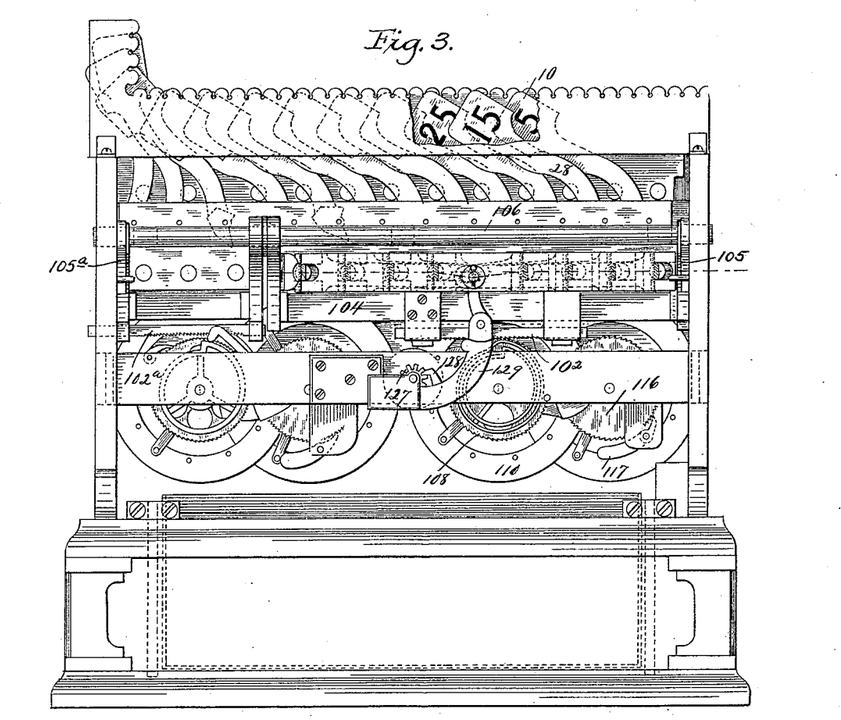
Fig. 3 is a rear elevation with the upper part of the case removed and a portion broken away to show the position of the numbered targets.

Referring to Fig. 1, 1 is the case in which the mechanism of the cash-register is inclosed.

2 is the money-drawer having the handle 3, by which it may be pulled out.

Figures 11, 12:
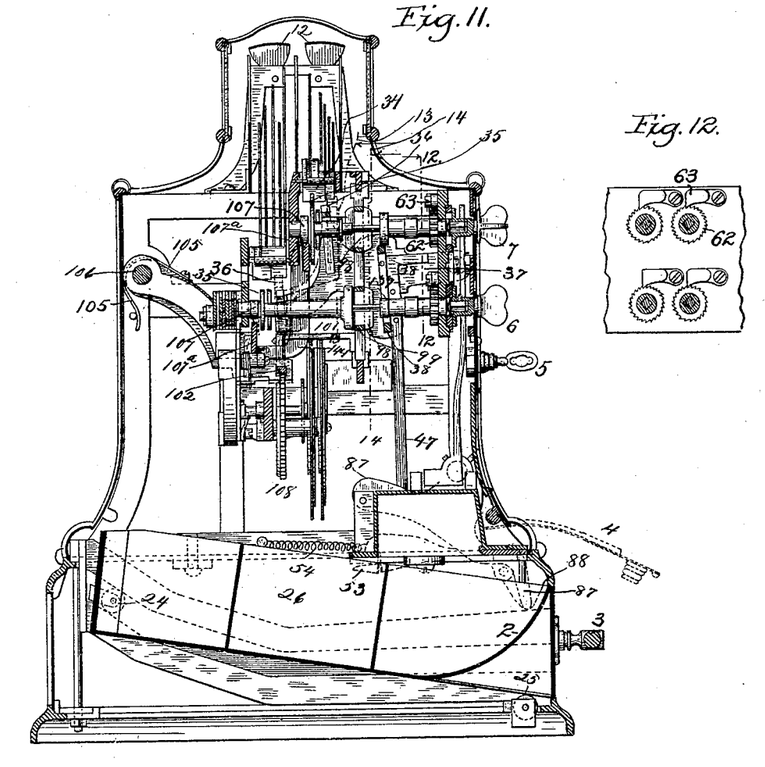
Fig. 11 is a vertical section on the line 11 11 of Fig. 2, the case being shown, however, and the money-drawer closed.
Fig. 12 is a detail view of the ratchet and pawls for preventing backward rotation of the keys. The view is a section on the line 12 12 of Fig. 11.
Figure 12A:
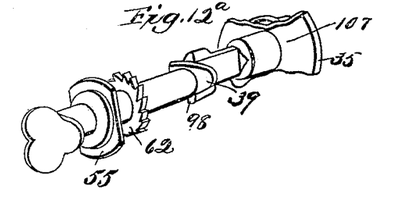
Figure 12B:
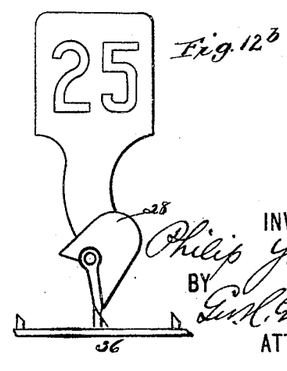
Figure 13:
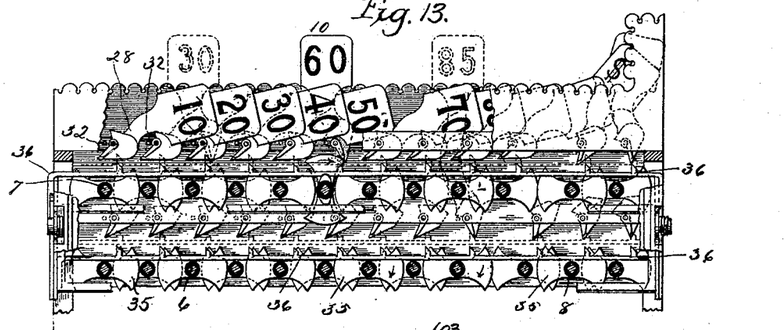
Fig. 13 is a detail sectional view on line 13 13 of Fig. 11, showing the apparatus for lifting and locking the targets.

4 is a hinged door in the front of the case controlled by the key 5, which door may be turned down as shown in dotted lines in Fig. 11, in order to give access to certain portions of the mechanism.

6 is a row of keys representing odd multiples of five, such as "5," "15," "25," &c. 7 is a similar row of keys representing even multiples of five, as "10," "20," &c.

8 is a series of keys representing dollars.

9 is an opening at the top of the case through which the numbered targets 10 corresponding to the various keys become visible when raised by the turning of said keys.

12 12, Figs. 2, 4, 6, 11, and 24, are drop-shutters which close the target-opening spaces 9 when operated with that object by the movement of some part of the machine—as, for instance, the money-drawer 2.

Figure 4:
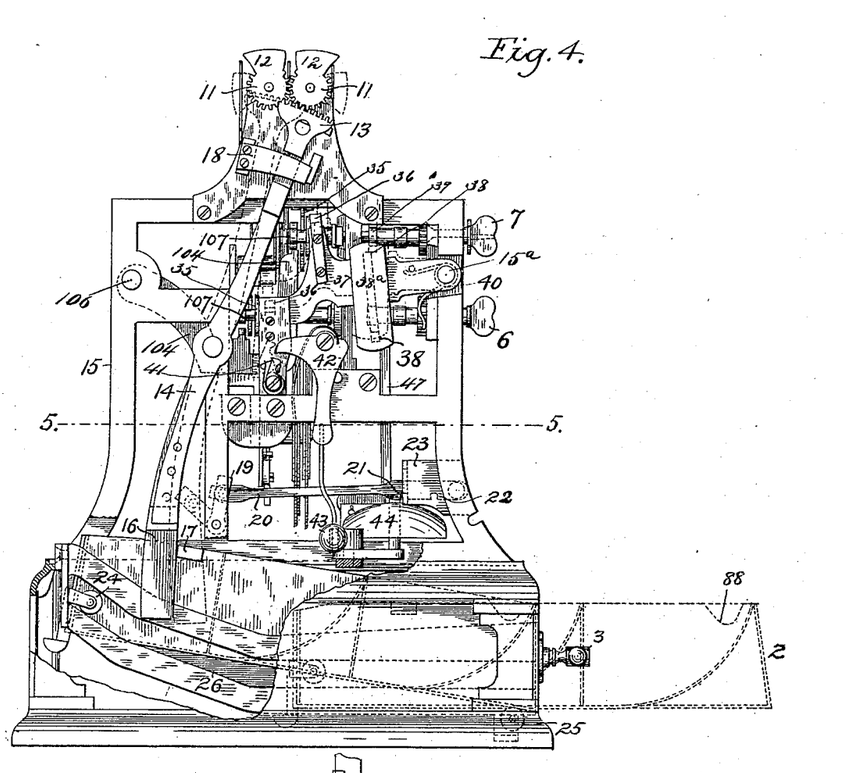
Fig. 4 is a left-hand side elevation with the upper portion of the case removed and a part of the lower portion broken away.

The specific form of mechanism which I have employed to transmit motion from the money-drawer to the drop-shutters consists of the lever 14, Fig. 4, pivoted upon the main frame 15 of the cash-register, and provided at its upper end with a toothed sector 13, which meshes with another toothed sector 11 upon one of the shutters 12. The other end 16 of the lever 14 is in the line of travel of the projecting lug 17 on the money-drawer 2. The operation of this portion of the mechanism will be therefore to raise the shutters 12 when the drawer 2 is closed. When the drawer is open, the lower end 16 of the lever 14 falls as far as the stop 18 will permit the lever to swing, and thereby drops the drop-shutters 12 and shuts off the target 10 from view. When the drawer is closed again, the drop-shutter is raised and the amount of the purchase which has been registered is disclosed to the customer. If the drop-shutters are to remain continually lifted, the stop 19 is pushed down by the rod 20, as shown in dotted lines in Fig. 4. The notches 21 and 22 on the outer end of the rod 20 drop over the stop 23 and hold the mechanism in either desired position.

Figures 6, 8, 9:
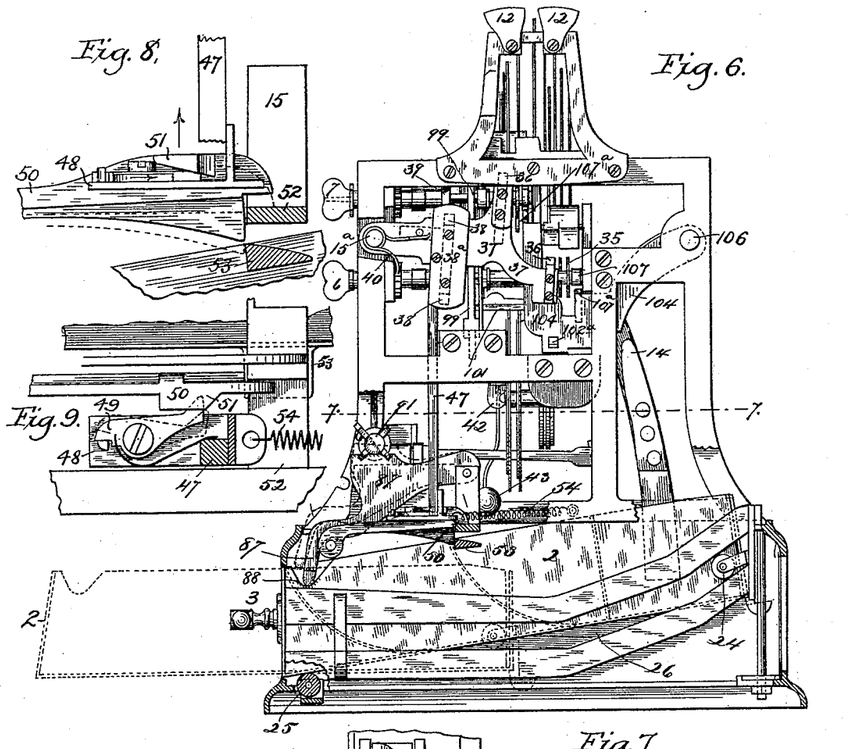
Fig. 6 is a right-hand side elevation with the case removed and with parts of the main frame broken away or shown in cross-section to show the lock-tripping device.
Fig. 8 is an enlarged detail vertical section showing the lock-tripping device.
Fig. 9 is a similar horizontal section.
Figure 7:
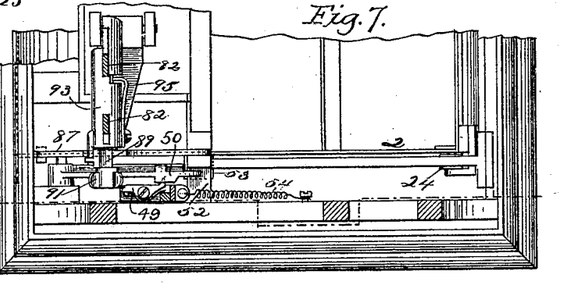
Fig. 7 is a horizontal section on line 7 of Fig. 6.
Figure 10:
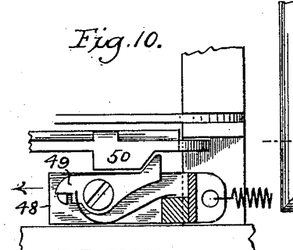
Fig. 10 is an enlarged detail horizontal section showing the lock-tripping device in its normal position of rest.

The drawer 2 is supported on the stationary roller 25 at the front of the casing, and carries at its rear end two rollers 24 which travel in the trackways 26, Figs. 4, 6, and 11. As the rear portion of said trackway is inclined upward, it is evident that the drawer when released will gravitate or slide forward and open automatically.

The numbered targets 10 are mounted on curved vibrating-levers 28, Figs. 3, 13, 16, and 17. When said targets are lowered, the levers rest against suitable stops. Said target-levers are journaled on pivots 30, (see Figs. 16 and 17,) and, in addition to their weight, have the springs 31 to force them into the position shown in Fig. 3. When raised, the target-lever rests against the stop 32. The lower end of the target-lever is provided with a lifting-toe 33 and the locking-toe 34. The lifting-toes 33 are acted upon by the double cams 35 (see Fig. 13) twice in every revolution of the corresponding key 6, 7, or 8. After the cam 35 has lifted the target into its upright position, a locking-bar 36, Figs. 6, 11, 12$^b$, and 13, having a number of projections on its upper side, rises, and one of said projections coming under the locking-toe 34 locks the target in its lifted position. There are two of the locking-bars 36, one for the upper and forward row of indicators, and the other below and in rear of the first one for the second row of indicators, as seen in front elevation in Fig. 13, and in the end views in Figs. 4 and 6, and in section in Fig. 11. These bars are secured at their opposite ends to the side arms 37 of a swinging frame hung at its forward end to the framework at 15$^a$ and yieldingly held in this upper position by springs 40, Figs. 4 and 6. The side arms 37 are at the extreme opposite sides of the machine and the bars 36 extend the full width of the machine, the upper forward bar 36 co-operating with all of the indicators in the front row, both in the cents and dollars series, and the lower bar 36 co-operating with all the indicators in the rearmost set. In addition to the cross-bars 36 the swinging frame carries two other cross-bars 38 secured at their opposite ends to side plates 38$^a$ fastened upon the side arms 37, Figs. 4 and 6. The upper one of these two bars 38 rests immediately below a series of cams 39 fast upon the keys of the upper row, and the lower bar 38 rests immediately below a similar series of cams upon the lower row of keys. The result of this is that whenever any one of the keys is given a quarter-turn its cam 39 will depress the swinging frame and disengage the locking-bar 36 from the indicators which it had been supporting, thus releasing them and permitting them to drop out of view. During the further movement of the key to a half-turn its cam 39 will clear the bar 38 and the spring 40 will throw the swinging frame up again, bringing the bars 36 into position to support the indicator which has been lifted by the cam 35 of such key, as before described.

Figure 5:
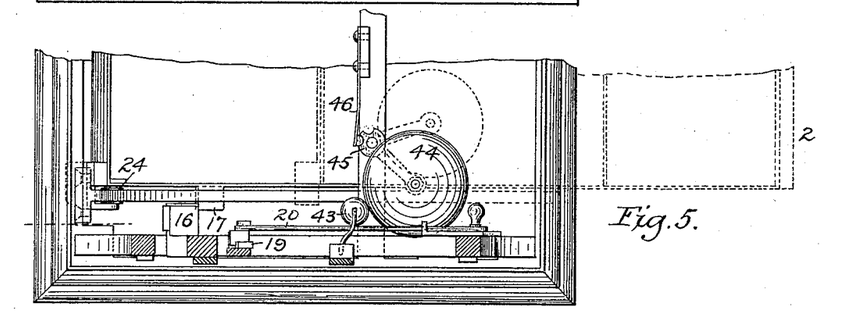
Fig. 5 is a horizontal section on line 5 5 of Fig. 4, showing the clip for holding the alarm-bell in or out of position.

Upon the vibrating frame 37 is mounted the spring-pawl 41, Fig. 4, which on the upward movement of the frame 37 catches the end of the bell-crank 42, on the other end of which hammer 43 is attached. The recoil of the bell-crank under the influence of the spring 42ª causes the hammer to strike the gong 44 and sound the alarm. The gong 44 is mounted on the swinging arm 45, which may be held in either of two positions by the spring-clip 46, as shown in Fig. 5. When the gong is shifted over to the position shown in dotted lines, it will be out of reach of the hammer and will no longer sound. Upon the other end of the vibrating frame 37 is the arm 47. (See Figs. 6 to 10.) Upon the lower end of the arm 47 is the foot 48, Fig. 8, which carries the spring-latch 49, Fig. 9. The tumbler 50 resting on the cross-piece 52 of the main frame and dropping behind the lug 53 on the money-drawer forms therewith an automatic lock for said money-drawer when it is closed. The inclined lug 51 on the tumbler 50 serves to lift it when the spring-latch 49 slides under it, as it does during the upward motion of the vibrating frame 37. The tumbler 50 being thus elevated, the drawer slides out by its own weight. The spiral spring 54 may be employed to assist the spring 40 in insuring an equal forward and upward motion of the arm 47 and vibrating frame 37.

Figures 24, 26, 27:
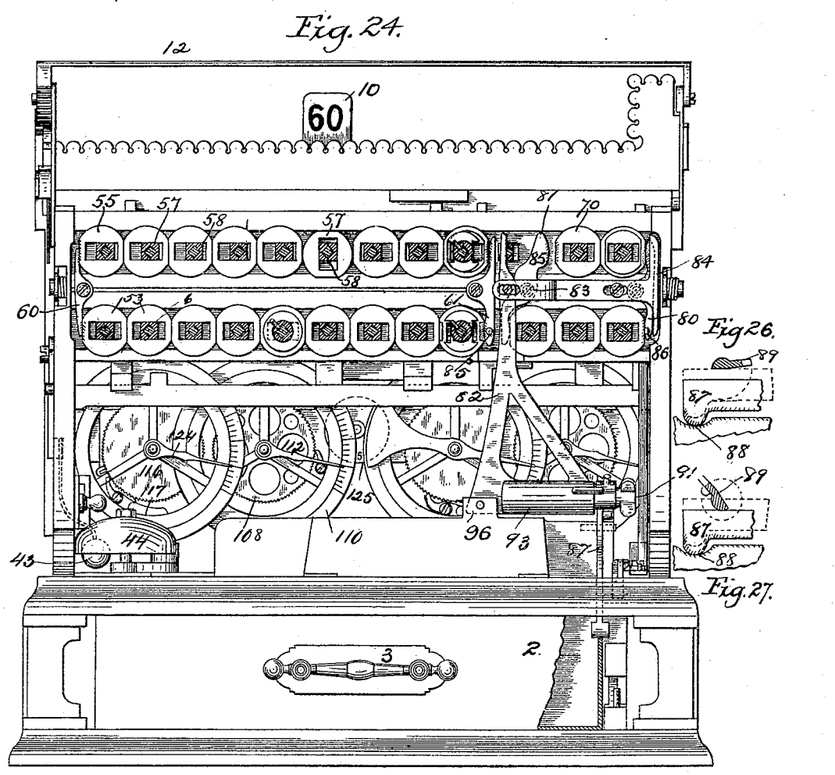
Fig. 24 is a front elevation and partial section showing the apparatus by which the operation of one key renders the simultaneous operation of any other key of that series impossible.
Figs. 26, 27, and 28 are detail views showing different positions of the adjustable connection between the clamp and the money-drawer.
Figures 25, 28, 29, 30:
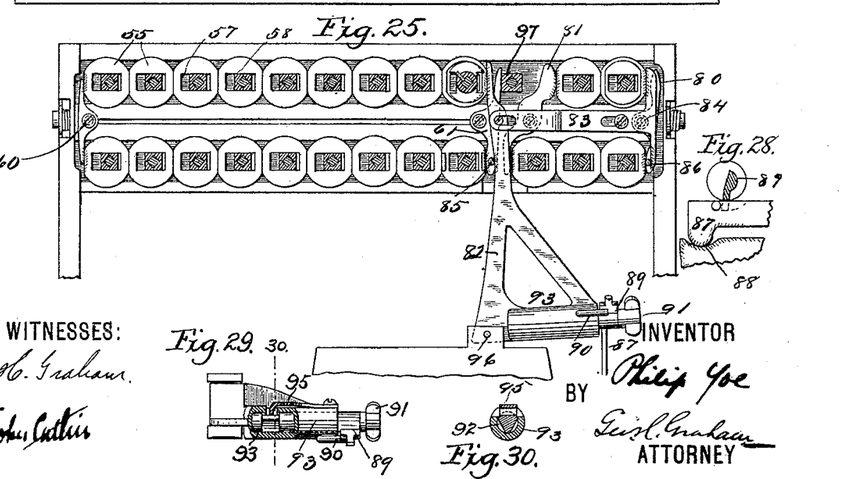
Fig. 25 shows the clamp mechanism by which all keys may be locked.
Figs. 29 and 30 are details illustrating the construction of such adjustable connection, Fig. 30 being a section on line 30 30 of Fig. 29.

Upon the spindle of each rotating key is formed a rectangular shoulder 58, Fig. 24. The washers 55 have slots 57 formed therein which fit said shoulders. (See Figs. 24 and 25.) Said washers have their sides slightly flattened opposite the extremities of the above-mentioned slots. A similar set of washers is provided for the second row of keys. Levers 60 61 are pivoted to the main frame 15 at such positions that their ends come opposite the end of a row of washers and at distances which are just taken up by the amount of endwise sliding given said row of washers when any one of them is rotated. It is understood, of course, that when any key is in such position that its target is not exposed to view, the washer corresponding to such key has its flattened portions presented to its neighbor. When any one key is turned and its target raised, the full circular portion of its washer is presented to the adjoining washers and they are crowded to right and left. Inasmuch as the turning of one washer is sufficient to take up all the space left between the levers 60 61 and the ends of the rows of washers, it is evident that but one key can be rotated at a time. The keys representing dollars have a similar set of washers and two similar levers 81 and 80, which operate in a similar manner.

82 is a hinged clamp pivoted at 96 on the main frame. When this clamp is forced against the end of a row of washers, it is evident that all of the keys will be locked. The link 83 and cross-head 84 are connected to clamp 82, and by means of the lug 86 on lever 80 and lug 85 on lever 61 it is evident that the forcing of the clamp 82 toward the left hand will lock all the systems of keys with the exception of key 97 which operates a blank target, Fig. 25.

The drawer 2 has a depression 88 in one of its sides into which a tumbler 87 drops when the drawer is closed, Fig. 6, said tumbler being pivoted at its upper rear end in a bracket-support upon the framework. Formed integral with the lower end of the clamp 82 is a hollow sleeve 93, Figs. 7, 24, 25, 29 and 30, in which fits a rock-shaft 92 which is cut away at one point to triangular shape in cross-section, Figs. 29 and 30. The sleeve 93 is provided with an opening coincident with this cut-away portion of the shaft to permit the inturned end of a flat spring 95, secured to the outer side of the sleeve 93, to bear against the shaft and yieldingly hold it in the different positions to which it may be turned. The shaft 92 is provided at its right-hand end with a thumb-piece 91, by which it may be turned. Adjacent the right-hand end of the sleeve 93 the shaft has secured upon or formed integral with it an arm 89 overlying the front end of the tumbler 87 before referred to. In its normal position the arm 89 rests against a stop-pin 90 secured upon the outer side of the sleeve 93 and projecting beyond its end.

Figure 14:
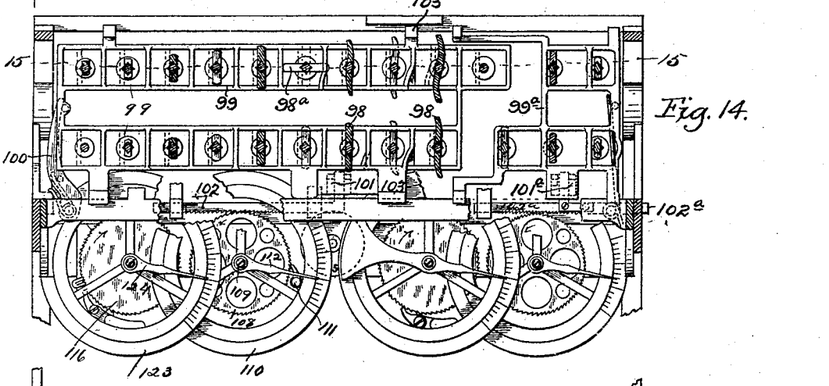
Fig. 14 is a similar section on line 14 14 of Fig. 11, showing the adding apparatus, the spring-controlled slide, and the graduated arms on the keys for operating the same by which the amounts represented by said keys are registered.
Figure 15:
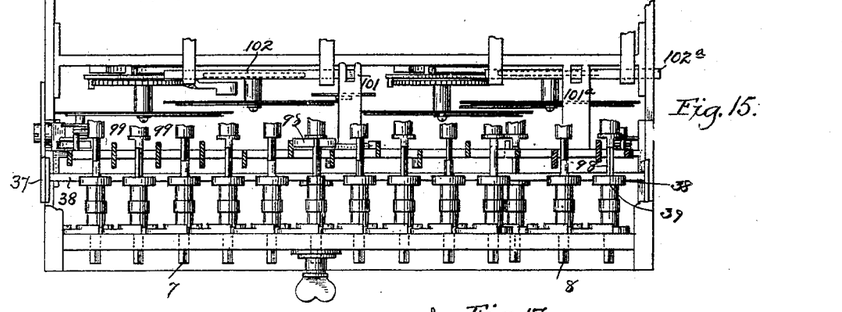
Fig. 15 is a horizontal section on line 15 15 of Fig. 14.
Figure 16:
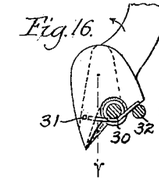
Figs. 16 and 17 are details of the lower portion of a target-lever, showing the lifting and locking toes.
Figure 17:
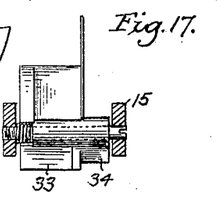

The operation of the parts above described is as follows: When the drawer is closed and the front end of the tumbler 87 resting in the notch in the drawer, as in Figs. 26 to 28, if the rock-shaft 92 be turned until the arm 89 is brought to the position shown in Fig. 27, (in which position it will be yieldingly held by the spring 95,) the result will be that when the drawer is opened and the tumbler 87 forced out of the notch in the drawer the sleeve 93 and parts carried by it will be lifted and the clamp 82 be tilted to the left, thereby locking all of the keys until the drawer is again closed. If the arm 89 be turned to the position shown in Fig. 28 when the drawer is closed, it will bear against the tumbler 87 as it turns and lift the sleeve 83 and tilt the clamp 82 and lock all of the keys, and also lock the drawer in its closed position. When the arm 89 is turned to the position shown in Fig. 26 the parts above described are inoperative and the keys remain unlocked whether the drawer be open or closed. At the same time that the rotation of any particular key lifts its target into view the amount represented by that key should be registered upon an adding apparatus. This is effected by means of a laterally-sliding frame 99, Figs. 6, 11, 14 and 15, pressed to the right by a spring-arm 100 and forced to the left hand (see Fig. 14) by graduated arms 98 upon the spindles of the several keys. The key 98ᵃ is shown in the act of effecting such movement of the slide 99. This sliding frame 99 is guided at its upper and lower ends upon ways 103, as shown, and has a rearwardly-projecting arm 101, Figs. 11 and 15, in a slot in whose rear end fits the upwardly-bent right-hand end of a sliding rack-bar 102, Figs. 14 and 15. The dollar-keys have a corresponding sliding frame 99ᵃ which has a projection 101ᵃ operating a similar rack-bar 102ᵃ. The rack-bars 102 and 102ᵃ operate the adding and registering mechanism and as the two mechanisms for dollars and cents are similar only one will be figured and described.

Figures 18, 19, 20, 21, 22:
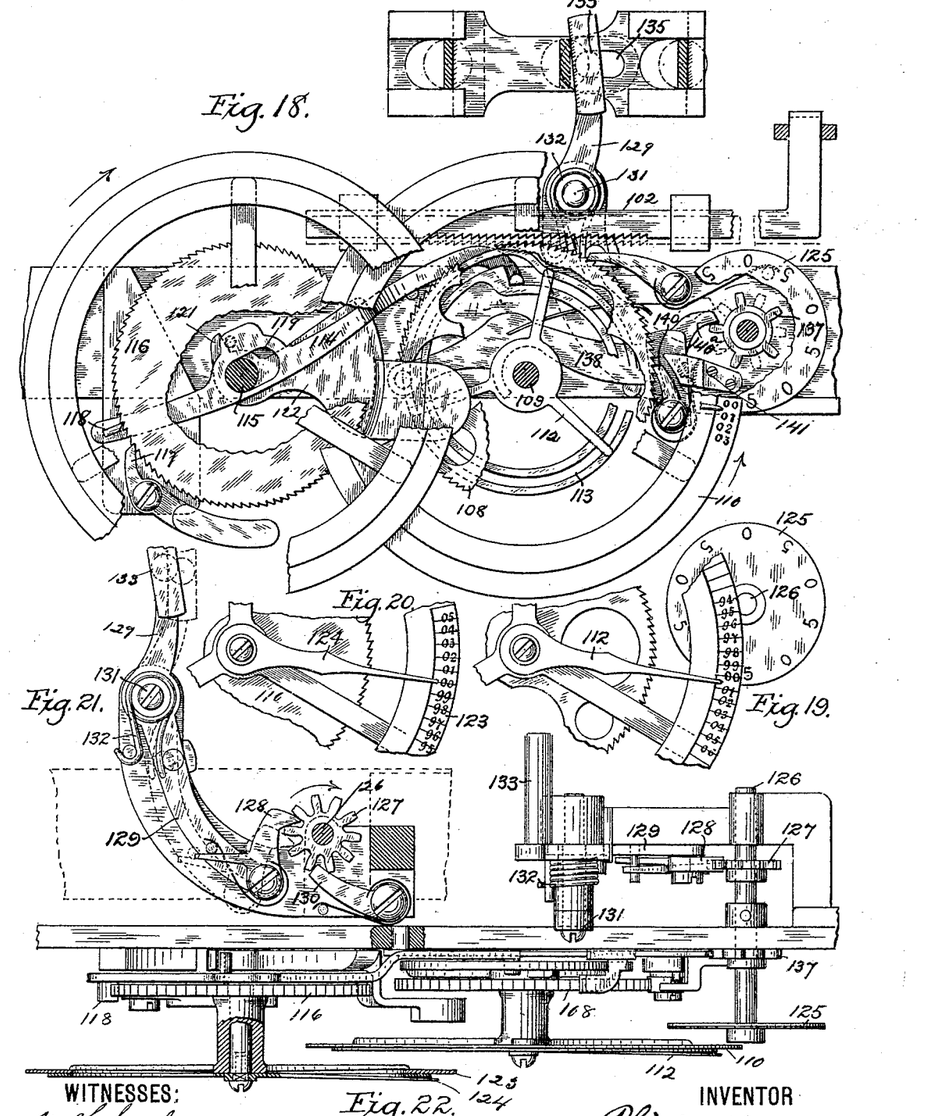
Fig. 18 is a detail view with parts broken away, showing the adding apparatus.
Fig. 19 is a detail view of the register for tens and of the disk for registering fives.
Fig. 20 is a similar view of the register upon the secondary wheel of the adding apparatus for registering the number of rotations of the primary wheel.
Fig. 21 is a detail of the pawl-lever which operates the disk and connections by which are registered odd fives.
Fig. 22 is a detail plan view, partly broken away, of the adding apparatus.

The rack-bars 102 and 102ᵃ are mounted in the vibrating frame 104, composed of two side arms hung at their rear ends upon the rod 106 and united at their forward ends by two cross-bars 107ᵃ, Figs. 2, 3, 4, 6 and 11, and normally held in upper position by springs 105. The upper cross-bar 107ᵃ of this frame rests immediately beneath a series of cams 107 upon the upper row of keys, Figs. 4, 6, 11 and 12ᵃ, and the lower cross-bar immediately beneath a similar series of cams upon the lower row of keys. At the first movement of any one of the keys its cam 107 will depress the front end of the swinging frame and carry the sliding rack-bars into engagement with the ratchets of the registering mechanism and maintain them in engagement therewith during the movement of the sliding frame 99 to the left under the action of the cam 98 of such key, so that the movement of the sliding frame will be transmitted to the registering mechanism. As the key completes its movement and its cam 98 releases the sliding frame, to permit the latter to be reset, the cam 107 upon the key will also clear the bar 107ᵃ of the swinging frame and the springs 105 will lift the front end of the latter and disengage the rack-bar from the ratchet of the register so that it may be free of the latter during its return movement. The ratchet-bar 102 co-operates with the ratchet 108 of the cents-registering wheel, Fig. 13 and 18, while the bar 102ᵃ co-operates with the ratchet of the dollars-registering wheel.

The ratchet-wheel 108 is mounted on the pivot 109 (see Figs. 18 to 22) and has the proper figures upon its circumference 110. These figures represent tens and the ratchet-wheel is moved one tooth for every ten indicated by the cash-register. This wheel I call the "primary" wheel. Its backward motion is prevented by the pawl 111, Fig. 13. When the primary wheel has made one complete revolution, the secondary wheel 116 is moved one tooth and the fact is registered on the rim 123 of this secondary wheel by mechanism which I will now describe. The primary wheel has the camway 113 formed rigid therewith. The lever 114 is mounted on the shaft 115 of the secondary wheel and is capable of endwise motion thereon by virtue of the slotted opening 119 in said lever. The pin 114ᵃ on the outer end of the lever 114 rests in the camway 113. The other end of the lever has a tooth 118, which meshes with the ratchet-wheel 116. The weighted pawl 117 prevents backward motion of said ratchet-wheel. The weighted arm 122 is journaled on the shaft 115 and has a projecting toe 121, which bears against the pin 120 on the lever 114. The weighted arm 122 normally tends to force the tooth 118 into engagement with the ratchet-wheel 116 and also to turn said ratchet-wheel. This, however, is not permitted except when the end 114ᵃ of the lever falls over the cam 113, at which time sufficient motion is given said lever to move the secondary ratchet-wheel 116 one tooth. The pointers 112 and 124 are stationary and serve to mark the degree of rotation upon the numbered rims of the two wheels.

The foregoing mechanism registers all the even multiples of ten represented by the keys corresponding to cents. If the key representing "65" is turned, six tens will be registered upon the above-described apparatus. To register the odd five, I employ the mechanism which I will now describe.

Figure 23:
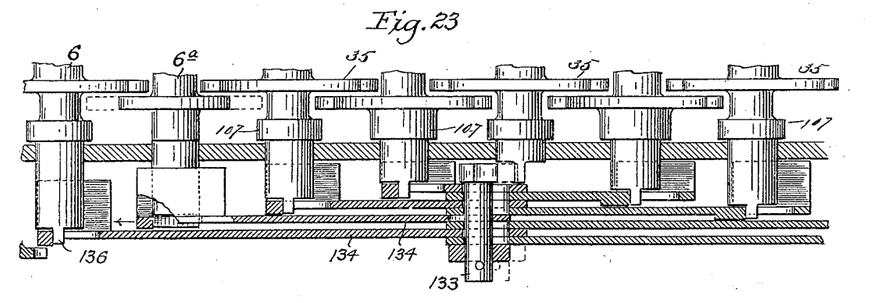
Fig. 23 is a detail in horizontal section of the independent connections from the keys indicating odd multiples of five to the pawl-lever which operates the registering apparatus therefor.

In Fig. 23 the rear ends of the spindles of the keys indicating odd multiples of five are shown provided with projections 136. At every half-revolution of one of said keys, such projection causes the endwise sliding of the bar 134 corresponding to such key. All of said bars 134 have elongated openings 135, which surround the common pin 133. This pin 133 is a projection from the upper end of the pawl-lever 129, Figs. 18 and 21, which is pivoted at 131 to an arm of the main frame, and is controlled by the spring 132. On the lower end of said lever is mounted the spring-pawl 128, Fig. 21, which engages the teeth of a star-wheel 127, mounted on a shaft 126 journaled in the main frame, and carrying the disk 125, Figs. 19 and 22, and the second star-wheel 137. This latter star-wheel has half the number of teeth of the first star-wheel, as shown in full lines, Fig. 18. The spring-pawl 130 prevents backward motion of said star-wheels. The lever 138 carrying the spring-pawl 140, Fig. 18, which engages with the ratchet-wheel 108, is operated by this second star-wheel 137, one of the five teeth of the latter striking the toe 140ᵃ of the lever and lifting the latter and advancing the wheel 108 at each alternate movement of the wheels 125 and 137. 141 is a stop for pawl 140. The operation of this portion of the device then is to cause a lifting of the lever 138 and the rotation of the ratchet-wheel 108 one tooth for every two movements of the pawl-lever 129. It is evident, then, that the odd fives represented by the keys 6 will thus be added to the total of the tens. The registration of such fives is effected by the disk 125, which shows a figure "5" or a "0" between the two sets of adding apparatus according as an odd or an even number of fives has been added up. Upon each of the rotating keys is a little ratchet-wheel 62, with which the weighted pawl 63 meshes, as shown in Fig. 12, thereby preventing the backward rotation of any key.

The general construction and operation of my invention will be understood from the previous description. Each rotating key has, first, a graduated arm for the purpose of moving the adding mechanism a distance proportional to the value of that key; second, a set of cams for throwing up once in every half-revolution the numbered target corresponding to that key; third, a cam for depressing the vibrating frame 37, which on rising again locks said target in raised position; fourth, a cam 107 for depressing the vibrating frame 104 and throwing the rack-bars 102 102$^a$ into mesh with the ratchet-wheels, which drive the adding mechanism and register the multiples of ten and the dollars. The odd fives are registered by the auxiliary apparatus illustrated in Figs. 18 to 23. At the same time that the above operations take place, the movement of the vibrating frame 37 rings the alarm and trips the automatic lock so as to permit the money-drawer to slide out and open, said action of the money-drawer dropping the shutters before the numbered targets and disclosing them only when the drawer is closed again. By opening the door 4, the adjustable connection between the locking-clamp 82 and the money-drawer may be so manipulated that the whole machine may be locked, or the turning of a registering-key may be made possible only when the drawer is closed, or the said keys may be left free to turn whether the drawer is opened or closed. During the rotation of any one of the series of keys 6 or 7, representing cents, the rotation of any other key of those series is impossible, as above explained; but the series of keys 8, representing dollars, are entirely independent of the first-mentioned series, so that a dollar-key and a cent-key may be operated at the same time, and as they have separate adding mechanisms they do not interfere one with the other.

From the explanation which has been given it will be understood that upon operating any one of the keys by giving it a half-revolution its cam 39 will depress the swinging frame 37 and disengage the locking-bars 36 from the exposed indicators, releasing the latter and permitting them to be withdrawn from view. At the same time the cam 35 of the operated key will engage the toe 34 of the corresponding indicator and lift the latter to indicating position, where it will be held by the locking-bar 36 when the frame 37 is released by the cam 39 and returned to normal position by the spring 40. Thus at each operation of a key all of the exposed indicators will be released and withdrawn from view and the indicator corresponding to the operated key be moved to indicating position. When the vibrating frame 37 is depressed in the manner above described the spring-latch 49 carried by the lower end of the arm 47, Figs. 6 to 10, will catch under the projection 51 of the drawer-holding tumbler 50 and when the frame 37 is released and thrown upward again by its spring the latch will lift the tumbler out of engagement with the lug 53 upon the drawer, thereby releasing the latter and permitting it to slide to open position. As the drawer moves forward its lugs 17 will be carried away from the lower end of the lever 14, Fig. 4, and the latter will swing forward and throw the screens 12 12 downward to the positions indicated by the dotted lines, to hide the indicators. When the drawer is closed again, the screens will be thrown upward to expose the new indication. Simultaneously with the opening of the drawer the spring-pawl 41, Fig. 4, will trip the gong-hammer and sound the alarm. At the beginning of the movement of the key the cam 107 upon its rear end will have depressed the swinging frame 104, Fig. 4, which carries the register-operating ratchet-bar 102 (assuming the operated key to be in the cents series) and throw said bar into engagement with the ratchet 108 of the tens-registering wheel, Figs. 13 and 18. During the further turning of the key its cam 98, Fig. 13, will slide the frame 99 to the left, the rearwardly-projecting arm 101 on said arm, Fig. 15, carrying the bar 102 with it and adding the value of the key (or the tens of its value if it be an odd-numbered one) upon the wheel 108. When the cam 98 clears the engaging surface of the frame 99 the latter will be thrown back to the right by the spring-arm 100 at its left-hand end, the ratchet-bar 102 moving clear of the wheel 108 owing to the release of the frame 104 by the cam 107 and the lifting of said frame by its spring 105, as heretofore described. If the operated key should happen to be an odd-numbered one the cam 136 upon its rear end, Fig. 23, will actuate one of the plates 134 and cause it to vibrate the lever 129, Fig. 21, whose pawl 128, engaging the pinion 127, will advance the five-cent-registering wheel 125 one number. At each alternate movement of said wheel the wheel 108 will be advanced one number by the pawl 140 carried by the lever 138 whose toe 140$^a$ engages the five-toothed wheel 137 on the shaft of the wheel 125, Fig. 18, and at each complete revolution of the wheel 108 the wheel 116 will be advanced one tooth by the pawl 118 on the lever 114 whose pin 114$^a$ fits in the camway 113 on the wheel 108.

While I have described a specific form of mechanism embodying the several improvements, it is obvious that the details of construction thereof may be modified from those shown, and that many of the novel features may be employed in other registers without departing from the invention.

Having therefore described my invention, what I claim as new, and desire to protect by Letters Patent, is—

1. In a cash register, the combination of a series of rotary operating keys turning on horizontal axes extending from front to rear of the machine, an equal number of movable targets actuated by said keys and reciprocating in vertical planes transverse to the axes of the keys, and means common to the targets and keys by which when a target is exposed to view by the operation of a key it is maintained in view and the previously exposed target withdrawn from view, substantially as described.

2. In a cash register, the combination of a series of movable targets and a series of rotary keys which actuate said targets, said keys turning in one direction only, together with a common locking device actuated by any one of said keys to lock the target corresponding thereto in its raised position, an adding apparatus, and graduated trains of mechanism conveying different amplitudes of motion from different keys, upon the rotation thereof, to the adding mechanism, substantially as described.

3. In a cash register, the combination of a series of movable targets and a series of rotary keys which actuate said targets, said keys turning in one direction only, together with a common locking device actuated by any one of said keys to lock the target corresponding thereto in its raised position, a money drawer, an automatic lock for the same, an alarm and mechanism operated in unison with the target locking mechanism to unlock the drawer and sound the alarm, substantially as described.

4. In a cash register, the combination of the money drawer, a tell-tale device visible to the customer, and connecting mechanism whereby the tell-tale is moved to one position at the opening of the drawer and is positively moved to its opposite position by the drawer as the latter is closed to indicate whether the drawer is opened or closed, substantially as described.

5. In a cash register and indicator, the combination, with the indicators and the money drawer, of an automatic screen plate or shutter for the indicators, connections with the drawer for operating said plate to expose the indicators when the drawer is closed and hide them when it is opened, and means for temporarily holding the screen plate out of operation to permit the exposure of the indicators whether the drawer be opened or closed, substantially as described.

6. In a cash register, the combination of the sliding money drawer, the drop shutter bearing an indication of the position of said drawer, the toothed sector on the axis of said shutter, the lever pivoted to the main frame and provided at one end with a second toothed sector meshing with the first mentioned one, and having its other end in the line of travel of the drawer, substantially as described.

7. In a cash register, the combination of a series of movable targets, a row of rotary keys which actuate said targets, rectangular shoulders upon the spindles of said keys and slotted washers mounted thereon which washers are slightly flattened at those portions of their peripheries opposite the ends of the slots, whereby during the rotation of any one key the washers upon the remaining keys have their flattened portions jammed together so that the simultaneous rotation of two keys is rendered impossible, substantially as described.

8. In a cash register, the combination of a series of movable targets, a series of rotary keys which actuate the same, which keys are arranged in two rows, rectangular shoulders upon the spindles of said keys, slotted washers mounted thereon which washers are slightly flattened at those portions of their peripheries opposite to the ends of the slots, said keys being so connected to their targets that when the latter are not exposed the flattened portions of the washers are in contact, stop levers pivoted to the main frame having either extremity opposite the end of a row of washers and at distances just sufficient to be taken by the rotation of any one washer, whereby but one of said series of keys may be rotated at any one time, substantially as described.

9. In a cash register, the combination of a series of movable targets, a row of rotary keys which actuate said targets, rectangular shoulders upon the spindles of said keys and slotted washers mounted thereon which washers are slightly flattened at those portions of their peripheries opposite the ends of the slots, whereby during the rotation of any one key the washers their flattened portions are jammed together so that the simultaneous rotation of two keys is rendered impossible, together with a clamp by which all said washers may be jammed together and the rotation of even one key prevented, substantially as described.

10. In a cash register, the combination of a series of movable targets, a row of rotary keys which actuate said targets, rectangular shoulders upon the spindles of said keys, and slotted washers mounted thereon which washers are slightly flattened at those portions of their peripheries opposite the ends of the slots, whereby during the rotation of any one key the washers upon the remaining keys have their flattened portions jammed together so that the simultaneous rotation of two keys is rendered impossible, together with a clamp by which all said washers may be jammed together and the rotation of even one key prevented, the sliding money drawer and an adjustable connection between said clamp and money drawer whereby the position of the clamp may be regulated by the opening and closing of the drawer, substantially as described.

11. In a cash register, the combination of a series of movable targets, a row of rotary keys which actuate said targets, rectangular shoulders upon the spindles of said keys, and slotted washers mounted thereon which washers are slightly flattened at those portions of their peripheries opposite the ends of the slots, whereby during the rotation of any one key the washers upon the remaining keys have their flattened portions jammed together so that the simultaneous rotation of two keys is rendered impossible, together with a second separate but similar series of targets and keys representing amounts of a different denomination, whereby two amounts of different denominations may be simultaneously indicated, but no two amounts of the same denomination, substantially as described.

12. In a cash register, the combination of a series of vibrating targets provided with lifting and locking toes, a series of rotary keys provided with cams which engage said lifting toes during a portion of the key's rotation, a locking bar which engages the locking toe of any target after said target has been lifted into position, the vibrating frame on which the locking bar is mounted, and the second series of cams on said keys which latter cams depress the frame until the target has been lifted into position and then permit it to rise and lock the said target until a second key rotation releases the first target and repeats the operation, all substantially as described.

13. In a cash register, the combination of a series of vibrating targets provided with lifting and locking toes, a series of rotary keys which engage said lifting toes during a portion of the key's rotation, a locking bar which engages the locking toe of any target after said target has been lifted into position, the vibrating frame on which the locking bar is mounted, and the second series of cams on said keys which latter cams depress the frame until the target has been lifted into position and then permit it to rise and lock the said target until a second key rotation releases the first target and repeats the operation, together with a money drawer, an automatic lock for said drawer, an arm on said vibrating frame, and a spring catch upon said arm for tripping said lock upon the upward motion of the vibrating frame, substantially as described.

14. In a cash register, the combination of an adding apparatus operated by a ratchet wheel, a sliding rack bar which operates the wheel, a spring controlled slide which operates said rack bar, a series of rotary keys turning upon their axes in one direction only, and arms on said keys graduated in length in proportion to the amount represented by each key and engaging with said slide, substantially as described.

15. In a cash register, the combination of an adding apparatus operated by a ratchet wheel, a rack bar which operates the wheel, a spring controlled slide which operates said rack bar, a series of rotary keys and arms on said keys graduated in length in proportion to the amount represented by each key and engaging said slide, together with a vibrating frame in which said rack bar is mounted, and cams upon said keys which depress said frame and cause the rack bar to mesh with the ratchet wheel during the forward motion of the slide but withdraw it from mesh during the backward motion of the slide, substantially as described.

16. In a cash register, the combination of an adding apparatus which registers tens, and a series of rotary keys which indicate multiples of ten, a second series of keys which indicate odd multiples of five, graduated arms upon said keys and connecting mechanism whereby motion is conveyed to the adding apparatus and the even tens indicated by any one of either said sets of keys registered thereby, a pawl lever, independent connections from said pawl lever to each of those keys indicating odd multiples of five, a star wheel operated by said pawl lever, a second star wheel of half as many teeth upon the same axis, and a second pawl lever operated by said second star wheel and operating the adding apparatus, whereby every two revolutions of the keys indicating odd multiples of five will effect one oscillation of the second pawl lever and effect the registering of a ten resulting from the addition of the two odd fives, substantially as described.

In witness whereof I have signed my name, in the presence of two witnesses, this 31st day of December, 1892.

PHILIP YOE.

Witnesses:
JOHN O'NEIL,
JULIUS LITTLEJOHN.